(12) United States Patent
Ing et al.

(10) Patent No.: US 7,345,677 B2
(45) Date of Patent: Mar. 18, 2008

(54) METHOD FOR LOCATING AN IMPACT ON A SURFACE AND DEVICE THEREFOR

(75) Inventors: Ros Ing, Paris (FR); Stefan Catheline, Montreuil (FR); Nicolas Quieffin, Paris (FR); Mathias Fink, Meudon (FR)

(73) Assignee: Sensitive Object, Boulogne-Billancourt (FR)

( * ) Notice: Subject to any disclaimer, the term of this patent is extended or adjusted under 35 U.S.C. 154(b) by 376 days.

(21) Appl. No.: 10/518,152

(22) PCT Filed: Jun. 12, 2003

(86) PCT No.: PCT/FR03/01769

§ 371 (c)(1),
(2), (4) Date: Dec. 9, 2004

(87) PCT Pub. No.: WO03/107261

PCT Pub. Date: Dec. 24, 2003

(65) Prior Publication Data

US 2005/0174338 A1    Aug. 11, 2005

(30) Foreign Application Priority Data

Jun. 12, 2002   (FR) .................................. 02 07208

(51) Int. Cl.
*G09G 5/00* (2006.01)
(52) U.S. Cl. ..................... 345/173; 345/177; 345/179; 345/182
(58) Field of Classification Search ................ 345/173, 345/177, 179, 182
See application file for complete search history.

(56) References Cited

U.S. PATENT DOCUMENTS 4,317,227 A * 2/1982 Skerlos .................... 455/180.4
5,059,959 A 10/1991 Barry
5,194,852 A * 3/1993 More et al. ................. 345/182
5,404,458 A 4/1995 Zetts
5,412,189 A 5/1995 Cragun (Continued)

FOREIGN PATENT DOCUMENTS

EP    0474 232 A2    3/1992

(Continued)

OTHER PUBLICATIONS

Fink, M., "Time-Reversed Acoustics," 1999, Scientific American, Nov. 1999, pp. 91-97.

(Continued)

*Primary Examiner*—Richard Hjerpe
*Assistant Examiner*—Leonid Shapiro
(74) *Attorney, Agent, or Firm*—Jones Day; Brett Lovejoy (57) ABSTRACT

Apparatus and methods for locating an impact point on a surface of an object. The object is provided with an acoustic sensor that senses the impact from the acoustic waves that are generated when the object is subjected to the impact. The location of the impact on the surface of the object is determined by a recognition step that includes a comparison of the sensed signal to one or more predetermined signals. Each predetermined signal represents an active zone on the surface of the object. A predetermined signal corresponds to the sensed signal when the impact causing the sensed signal is generated in the active zone represented by the predetermined signal. The impact is associated with the active zone represented by a predetermined signal when the sensed signal and the predetermined signal sufficiently correspond to each other.

44 Claims, 5 Drawing Sheets

U.S. PATENT DOCUMENTS

| | | | |
|---|---|---|---|
| 5,628,031 | A | 5/1997 | Kikinis et al. |
| 5,638,093 | A * | 6/1997 | Takahashi et al. ......... 345/173 |
| 5,691,959 | A | 11/1997 | Kriewall et al. |
| 5,717,432 | A | 2/1998 | Miwa et al. |
| 5,856,820 | A | 1/1999 | Weigers et al. |
| 5,986,224 | A | 11/1999 | Kent |
| 6,161,434 | A | 12/2000 | Fink et al. |
| 6,167,165 | A | 12/2000 | Gallagher et al. |
| 6,404,353 | B1 | 6/2002 | Coni et al. |
| 6,549,193 | B1 | 4/2003 | Huang et al. |
| 6,555,235 | B1 | 4/2003 | Aufderheide et al. |
| 6,724,373 | B1 * | 4/2004 | O'Neill et al. ............. 345/179 |
| 6,738,051 | B2 | 5/2004 | Boyd et al. |
| 6,891,527 | B1 | 5/2005 | Chapman et al. |
| 2001/0006006 | A1 | 7/2001 | Hill |
| 2003/0066692 | A1 | 4/2003 | Devige et al. |
| 2003/0164820 | A1 | 9/2003 | Kent |
| 2003/0217873 | A1 | 11/2003 | Paradiso et al. |

FOREIGN PATENT DOCUMENTS

| | | | |
|---|---|---|---|
| FR | 2595744 | * | 3/1986 |
| FR | 2757659 | | 6/1998 |
| FR | 2811107 | | 1/2002 |
| GB | 2301217 A | | 11/1996 |
| GB | 238 125 A | | 8/2003 |
| WO | WO 01/48684 A2 | | 7/2001 |
| WO | WO 03/005292 A1 | | 1/2003 |
| WO | WO 03/067511 A2 | | 2/2003 |
| WO | WO 03/067511 A | | 7/2003 |

OTHER PUBLICATIONS

Ing, R.K., et al., 2001, "Dynamic Focusing Using a Unique Transducer and Time Reversal Process," The 8th International Congress on Sound and Vibration, Jul. 2-6, 2001, Hong Kong, China, 8 pp.

Ing, R.K., et al., 1998, "Time-Reversed Lamb Waves," IEEE Transactions on Ultrasonics, Ferroelectrics, and Frequency Control, vol. 45, pp. 1032-1043.

Ing, R.K., et al., 2001, "Ultrasonic Imaging Using Spatio-Temporal Matched Field (STMF) Processing—Applications to Liquid Solid Waveguides," IEEE Transactions on Ultrasonics, Ferroelectrics, and Frequency Control, vol. 48, pp. 374-386.

McLaughlin, E.A., and J. Arvelo, Co-Charimen, May 2004, "Engineering Acoustics: Computational Acoustics, Ultrasonics and Applications," Jour. Acoust. Soc. Am., vol. 115, pp. 2587-2589, in particular, Abstract 5aEA9, "Time reversal interactive objects," by Ing et al.

Quieffin, N., et al., Mar. 2004, "Real time beam steering using a one channel time reversal mirror coupled to a solid cavity," 2 pp.

Quieffin, N., et al., May 2004, "Real-time focusing using an ultrasonic one channel time-reversal mirror coupled to a solid cavity," Jour. Acoust. Soc. Am., vol. 115, 6 pp.

Wilson, P.S., and E. Viverios, Co-Chairmen, Dec. 2002, "Physical Acoustics: General Linear Acoustics," Jour. Acoust. Soc. Am., vol. 112, pp. 2413-2415, in particular, Abstract 5aPA3, "Real time focusing using an ultrasonic 'one channel time-reversal mirror' coupled to a solid structure," by Quieffin et al. and Abstract 5aPA4, "Harmonic generation of Lamb waves," by R. K. Ing.

Draeger et al., 1999, "One-channel time-reversal in chaotic cavities: Experimental results," J. Acoust. Soc. AM 105 (2): 618-625.

Ing, et al., 2001, "Dynamic Focusing Using a Unique Transducer and Time Reversal Process," The 8th International Congress on Sound and Vibration, Jul. 2-6, 2001, Hong Kong, China, 18 pp, PowerPoint Presentation.

Kim et al., 2004, "Echo-to-reverberation enhancement using a time reversal mirror," J. Acoustic. Soc. Am 115 (4): 1525-1531.

Office Action, dated Jan. 5, 2007, for U.S. Appl. No. 11/024,514.

Office Action, dated Sep. 21, 2007, for U.S. Appl. No. 11/024,514.

* cited by examiner

METHOD FOR LOCATING AN IMPACT ON A SURFACE AND DEVICE THEREFOR

CROSS REFERENCE TO RELATED APPLICATIONS

This application claims priority to International Application No. PCT/FRO3/01769, filed Jun. 12, 2003, and published as WO 03/107261 A2, which in turn, claims priority to French patent No. FR2841022, filed Jun. 12, 2002.

BACKGROUND OF THE INVENTION a) Field of the Invention

The present invention relates to the methods for locating an impact on a surface and to the devices for implementing those methods.

b) State of the Art

More particularly, the invention concerns a method for locating an impact on a surface forming part of an object forming an acoustic interface, provided with at least one acoustic sensor (the object forming an acoustic interface may be made of a single piece or of several elements, assembled or at least in mutual contact), a method in which at least one signal is sensed from acoustic waves generated in the object forming an acoustic interface by said impact and the impact is located by processing of said sensed signal.

The document FR-A-2 811 107 describes an example of such a method that applies in particular to a pane. In this known method, the position of the impact on the surface of the object is computed by measuring the differences in time for the acoustic waves to fly to different sensors.

This known method however requires:

that the pane used have a perfect homogeneity and a perfect surface state, that the fields of the pane be specially treated, particularly to avoid reflections of the acoustic waves, that the speed of the acoustic waves in the pane be known in advance, which assumes a precise knowledge of its composition, that at least four sensors be used.

As a result, this known method is particularly costly to implement and cannot be applied to any preexisting objects, particularly heterogeneous objects consisting of assemblies of pieces, irregular shaped objects, etc.

The aim of the present invention is in particular to alleviate these disadvantages.

SUMMARY OF THE INVENTION

For this purpose, according to the invention, a method of the type in question is characterized in that it comprises a recognition step during which the sensed signal is compared with at least one predetermined signal corresponding to the signal that is sensed when an impact is generated on at least one active zone forming part of the surface of the object forming an acoustic interface (this comparison, which can be made both in the temporal domain and the frequency domain, may where appropriate be made on only one portion of the sensed signal or on data extracted from this sensed signal after processing, in which case said predetermined signal may be reduced to the portion on which the comparison is made or to the data on which the comparison is made), and the impact is associated with said active zone if the sensed signal is sufficiently similar to said predetermined signal.

Thanks to these arrangements, a method of locating an impact is obtained which is robust, adaptable to all objects (including heterogeneous objects consisting of assembly of several pieces or of placing several pieces in contact), easy and cheap to apply.

In preferred embodiments of the invention, one and/or other of the following arrangements may also be used where appropriate:

the surface of the object forming an acoustic interface comprises several active zones and, during the recognition step, the sensed signal is compared with several predetermined signals each corresponding to the sensed signal when an impact is generated on one of the active zones;

a single acoustic sensor is used;

several acoustic sensors are used and, during the recognition step, one signal is sensed for each acoustic sensor and the signals sensed by the various acoustic sensors are compared with the predetermined signals independently of one another;

the signals sensed by the various acoustic sensors are compared with the predetermined signals differently from one another;

several acoustic sensors are used measuring several different magnitudes;

at most two acoustic sensors are used;

the method comprises an initial learning step during which each predetermined signal is determined experimentally by generating at least one impact on each active zone;

each predetermined signal is a theoretical signal (computed or determined experimentally on an object identical or very similar from the acoustic point of view to the one used);

during the recognition step, the sensed signal is compared with the at least one predetermined signal by intercorrelation;

during the recognition step, the sensed signal is compared with the at least one predetermined signal by a recognition method chosen from voice recognition, signal recognition, shape recognition and recognition by neural network;

during the recognition step, the sensed signal is associated either with a single active zone, or with no active zone;

each active zone is associated with a predetermined information element (for example, an alphanumeric character, a command, etc.) and, when the impact is associated with an active zone, an electronic device is made to use the predetermined information element corresponding to that active zone;

the surface of the object forming an acoustic interface comprises a number n of active zones, n being at least equal to 2, and the recognition step comprises the following sub-steps:

an intercorrelation is made between the sensed signal (generally after normalization) and the predetermined signals $R_i(t)$, i being a natural integer lying between 1 and n which designates an active zone, and intercorrelation functions $C_i(t)$ are thus obtained, a potentially activated active zone j is determined which corresponds to the result of intercorrelation $C_j(t)$ having a maximum amplitude greater than those of the other results $C_i(t)$, the distribution $D'(i)$ of the amplitude maxima of the intercorrelation results is also determined:

$$D'(i) = \text{Max}(C'_i(tV)).$$

the distribution $D'(i)$ of the amplitude maxima of the intercorrelation results $C'i(t)$ between $Rj(t)$ and the various predetermined signals $Ri(t)$ is also determined:

$$D'(i)=\text{Max}(C'i(t)),$$

a determination is made as to whether the impact was generated on the active zone j as a function of a level of correlation between the distributions $D(i)$ and $D'(i)$;

during the recognition step, the sensed signal is processed in order to extract therefrom the data representative of certain characteristics of the sensed signal and the data thus extracted is compared with reference data extracted from the signal that is sensed when an impact is generated on each active zone;

during the recognition step, a code is determined from the data extracted from the sensed signal and this code is compared with a table which gives a correspondence between at least certain codes and each active zone;

the object forming an acoustic interface comprises at least two active zones and, during the recognition step, the resemblance values representative of the resemblance between the sensed signal and the predetermined signals are determined (especially a value derived from the intercorrelation function, for example its maximum), the impact is associated with several adjacent active zones corresponding to a maximum resemblance, called reference active zones, then, the position of the impact on the surface is determined as a function of the resemblance values attributed to the reference active zones;

the position of the impact on the surface is determined such that the resemblance values attributed to the reference active zones correspond as well as possible to theoretical resemblance values computed for the reference active zones for an impact generated in said position on the surface;

the theoretical resemblance values are a function of the position of the impact on the surface, determined in advance for each possible set of reference active zones;

the active zone is identified by comparison between the phase of the predetermined signals $Ri(t)$ and of the sensed signal;

during the learning phase, a computation is made of the Fourier transform $R_i(\omega)=|R_i(\omega)| \cdot e^{j\theta i(\omega)}$ each acoustic signal $R1(t)$ generated by an impact on the active zone i, where i is an index lying between 1 and n, and from this Fourier transform only the phase component $e^{j\theta i(\omega)}$ is retained, only in the frequency bands $\omega$ in which the amplitude $|R_i(\omega)|$ is greater than a predetermined threshold, then the same process is applied to each sensed acoustic signal $S(t)$ during the normal operation of the device;

the predetermined threshold is equal to the maximum of MAX/D and $|B(\omega)|$, where:

MAX is chosen from the maximal value of the modules $|R_i(\omega)|$, the maximal value of the modules $|R_i(\omega)|$ each normalized in energy, and the maximal value of the envelope of die average of the modules $|R_i(\omega)|$ each normalized in energy, D is a constant, $|B(\omega)|$ is the average of several noise spectra in the object forming an acoustic interface, acquired at different times;

during the normal operation of the device:

a product $P_1(\omega)$ is computed equal to $S'(w)$ multiplied by the conjugate of $R_i'(\omega)$ for references i=1 ... n, then the products $P1(\omega)$ are normalized, then the inverse Fourier transform of all the products $P_i(\omega)$ is carried out and temporal functions $X_i(t)$ are obtained, and the signal $S(t)$ is attributed to an active zone as a function of said temporal functions $X_i(t)$;

the signal $S(t)$ is attributed to an active zone as a function of the maximal values of said temporal functions $X_i(t)$.

Furthermore, another aim of the invention is a device especially adapted to implement an interfacing method as defined above.

Other features and advantages of the invention will emerge from the following description of five of its embodiments, given as nonlimiting examples, with respect to the attached drawings.

BRIEF DESCRIPTION OF THE DRAWINGS

In the drawings.

In the various figures, the same references designate identical or similar elements.

DESCRIPTION OF PREFERRED EMBODIMENTS

Figure 1:
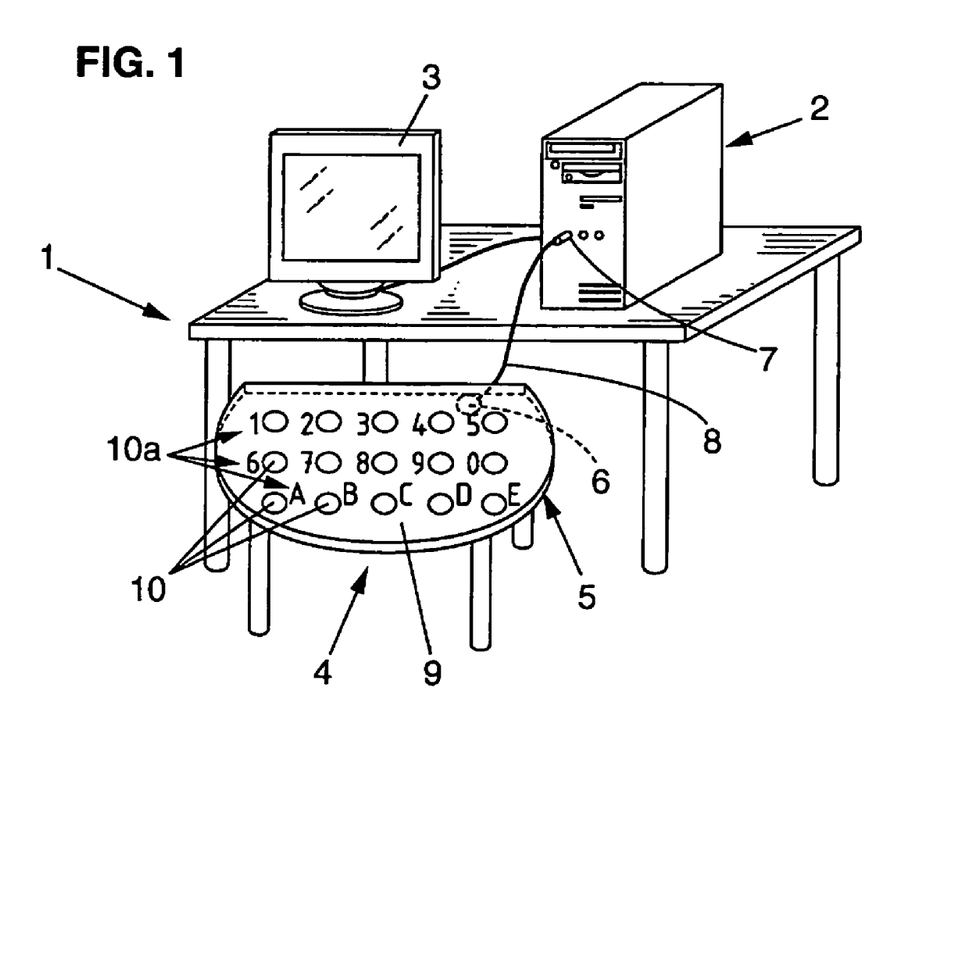
FIG. 1 is a schematic view in perspective showing an exemplary device comprising an acoustic interface adapted to implement a method according to a first embodiment of the invention.

FIG. 1 depicts a device 1 intended to implement the present invention, which comprises for example:

a microcomputer central processing unit 2, a screen 3 connected to the central processing unit 2, and an acoustic input interface 4 which is used to communicate information to the central processing unit 2 in the example in question.

The acoustic input interface 4 comprises a solid object 5, consisting here of a table in which acoustic waves are propagated by generating impacts on its surface 9 as will be explained hereafter.

It will be noted however that the object forming an acoustic interface could consist of any other object, homogeneous or heterogeneous, made up of a single piece or of several pieces assembled or simply in mutual contact, such as: pane, door, window, a portable tray, computer screen, display panel, interactive terminal, toy, vehicle dashboard, rear of front seat back of automobile vehicle or of airplane seat, wall, floor, vehicle fenders (the information transmitted by the acoustic interface then being the position of an impact on the fenders), etc.

At least one acoustic sensor 6 (only one sensor 6 in the example shown) is attached to the object 5, this acoustic sensor 6 being connected for example to the microphone input 7 of the central processing unit 2, by means of a cable 8 or by any other means of transmission (radio, infrared or other), so as to sense said acoustic waves and transmit them to the central processing unit 2.

The acoustic sensor 6 may for example be a piezoelectric sensor or other (for example a capacitive sensor, a magnetostrictive sensor, an electromagnetic sensor, an acoustic velocimeter, an optical sensor [laser interferometer, laser vibrometer, etc.], etc.). It may be suitable for measuring for example the amplitude of the movements due to the propagation of the sound waves in the object 5 forming an acoustic interface, or the speed or acceleration of such movements, or it may involve a pressure sensor measuring the pressure variations due to the propagation of the acoustic waves in the object 5.

On the external surface 9 of the object 5 (in this instance on the upper face of the table forming said object 5 in the example shown in FIG. 1), several active zones 10 are defined which can be delimited for example:

by a physical marking, removable or not, affixed to the surface 9 of the object 5, or by a luminous marking obtained by projecting an image onto the surface 9.

The surface 9 could also comprise portions in which the generation of an impact would be forbidden for example by covering them with a material that is flexible or simply inaccessible to the user, particularly for better reliability of the system.

The various active zones 10 may simply be portions of the surface 9, identical to the rest of the surface 9.

These active zones are however differentiated from one another and from the rest of the surface 9 to the extent that an impact on one of the zones 10 generates an acoustic signal different from the signal generated by an impact on another of the active zones 10 or on another portion of the surface 9.

Each of the active zones 10 is associated with a predetermined information element that a user may wish to communicate to the central processing unit 2. The information in question may for example be a command, a digit, a letter, a position on the surface 9, or any other information that can be habitually transmitted to an electronic device such as a microcomputer (or to the central processing unit of another electronic apparatus) by means of the conventional input interfaces such as keyboards, control buttons, mice or other.

The information in question may, where appropriate, be indicated in clear by the markings 10*a* on the surface 9 (as for the identifiers of the zones 10, these markings may be affixed physically to the surface 9 in a permanent or removable manner, or they may be projected in the form of luminous images onto said surface 9).

As a variant, the surface 9 of the object 5 may simply comprise identifiers (physically affixed or luminous) to distinguish the active zones from one another. These identifiers may for example be numbers or colors and a reminder of their meaning may where necessary be given by a display generated by the central processing unit 2 on the screen 3.

Where necessary, the surface 9 may also comprise no marking, either to delimit the active zones, or to identify the information to which they correspond, in which case the active zones 10 would be known only to the authorized users of the device 1.

It will be noted that the predetermined information elements associated with each active zone 10 may either be always the same or vary as a program runs in the central processing unit 2, or depend on previous actuations of other active zones 10 (certain active zones 10 may for example be actuated to change the function attributed to one or more active zone(s) 10 actuated after it, so as, for example, to access specific functions, special characters, or to put letters in upper case, etc.).

The various active zones 10 of the object 5 therefore constitute a true virtual keyboard that is actuated by hitting the active zones with a fingernail, with the fingertips, with an object such as a pen, stylet or other.

It will be noted that the surface 9 of the object 5 could, where appropriate, comprise a single active zone 10 in the simplest cases, this active zone 10 however not extending to the whole surface 9 and preferably constituting a small portion of said surface 9.

Figure 2:
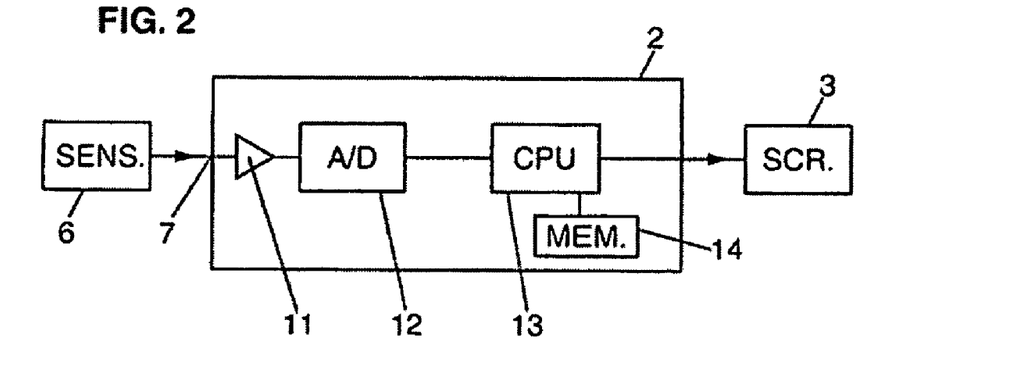
FIG. 2 is a block diagram of the device in FIG. 1.

As shown in FIG. 2, the sensor 6 (SENS.) may conventionally be connected via the input 7 to an amplifier 11 itself connected to an analog/digital converter 12 (A/D) which transmits the received signals to the processor 13 of the central processing unit 2 (CPU) which processor is in turn connected to one or more memories 14 (MEM.) and commands the abovementioned screen 3 (SCR.) or any other output interface sending information to the user.

It will be noted that the acoustic interface 4 could serve as an interface for inputting information to any electronic devices other than a microcomputer, for example a domestic or business electronic apparatus, a digicode, a vehicle electronic central processing unit, etc. In all cases, the electric signals generated by the sensor or sensors 6 may be processed either in this electronic apparatus or in an external digital signal processing device (DSP).

During the use of the device 1 described above, when a user generates an impact on the surface 9 of the object 5, this impact engenders an acoustic wave which is propagated in the object 5 to the acoustic sensor 6. The acoustic sensor 6 then generates an electric signal S(t) which, after digitization, is processed by the processor 13 (or by another dedicated processor, inside or outside the central processing unit 2).

The processor 13 then compares the received signal with the various predetermined signals belonging to a library of signals previously stored in the memory 14, these predetermined signals corresponding respectively to impacts generated on the different active zones 10 of the object 5.

This comparison is used to ascertain whether the acoustic signal originates from one of the active zones 10, and which, irrespective of the mode of excitation of said active surface (impact of a fingernail, of a fingertip, of the palm of a hand, of an object such as a pen or a stylet, etc.).

These predetermined signals from the library of signals may have been determined during an initial learning phase in which impacts are generated successively on all the active zones 10 of the object 5, by recording the corresponding signals (preferably after normalization, for example so that the energy of each reference signal is equal to 1) received in the central processing unit 2 via the acoustic sensor 6.

As a variant, when the object 5 has a simple and/or repetitive geometric shape, it is possible for the predetermined signals from the library of signals to be obtained by modeling or determined experimentally only once for all the objects 5 of a series of identical objects: in these two cases, there would therefore not be a prior learning phase for the particular object 5 connected to the central processing unit 2, but simply installation of the library of signals in the memory 14 of said central processing unit.

It will be noted that, in some cases (particularly if the object 5 is made of wood), the predetermined signals from the library of signals may be made to vary according to the ambient conditions, particularly the temperature and the humidity. These variations may be computed or be the result of a new learning phase.

The signals received during the use of the device 1 can be compared with the predetermined signals from the library of signals:

- directly on the temporal signals S(t) received from the sensor 6,
- or on the frequency spectrum of these signals (for example after Fourier transform of the temporal signals received from the sensor 6),
- or on other data characteristic of the signal, particularly its phase.

The sensed signals can be compared with the predetermined signals from the library of signals by any known means, in particular:

- by intercorrelation,
- by known methods of voice recognition, of signal recognition or of shape recognition,
- by the use of neural networks or others.

As a more precise example, the following method can in particular be used to recognize the active zone 10 from which the sensed signal S(t) comes:

(1) after normalization of the sensed signal S(t) (for example S(t) is calibrated so that its energy is equal to 1), the signal S(t) generated by the sensor 6 is intercorrelated with the n predetermined signals also normalized from the library, denoted $R_i(t)$ where $i=1 \ldots n$. Functions $C_i(t)$ are thus obtained that are the temporal results of the product of intercorrelation of the signal S(t) respectively with the signals $R_i(t)$ from the library. Based on these computations is determined a potentially activated active zone j corresponding to the result of intercorrelation $C_j(t)$ having a maximum amplitude greater than those of the other results $C_i(t)$.

(2) The distribution D(i) of the amplitude maxima of the intercorrelation results is also determined:

$D(i) = Max(C_i(t))$ where $i=1 \ldots n$.

(3) A second distribution function DN(i), obtained in the same manner as the computation of the function D(i) but replacing S(t) with $R_j(t)$, is computed.

(4) An intercorrelation is carried out of the distributions of the amplitude maxima D(i) and DN(i). If the maximal amplitude E of the result of intercorrelation between D(i) and DN(i) is sufficient, then j is the considered number of the activated zone. Otherwise, the signal generated by the sensor corresponds to a false alarm.

Figure 3:
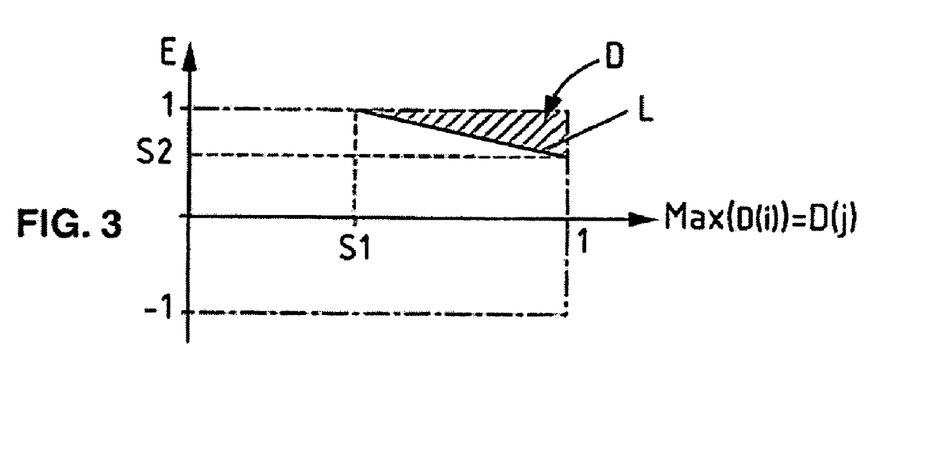
FIG. 3 depicts a graph illustrating an exemplary method used to associate an impact on the surface of the acoustic interface visible in FIG. 1, with an active zone of that surface.

During this step (4), E and the maximal value of D(i), or Max(D(i)) can simply be computed: if these two values are considered to be the coordinates of a point in a two-dimensional space of axes x=Max(D(i)) and y=E, as shown in FIG. 3, a curve threshold L can be determined in advance (empirically or by computation) which delimits a domain D corresponding to the validated points (this domain is finite and limited at x=1 and y=1, absolute maximal values of D(i) and E). The sensed signals which give points outside the domain D, for their part, are eliminated as being false alarms.

In the example in question, the line D is a straight line which can pass for example through the points (S1, 0) and (0, S2). For example, S1=0.4 and S2=0.4 or 0.6.

It will be noted that in addition to identifying the active zone 10 from which the impact comes, it would be possible to measure the force of the impact, for example in order to guide the user in how to use the acoustic interface, or to modulate the action triggered by an impact on an active zone 10, according to the intensity of that impact.

It will be noted furthermore that the signals originating from the active zones 10 may, where necessary, be recognized by using only a portion of the received signals S(t) or a portion of their frequency spectrum or more generally a portion of their characteristics. In this case, during the recognition step, the sensed signal is processed in order to extract from it data representing certain characteristics of the sensed signal and the data thus extracted is compared with reference data extracted from the signal which is sensed when an impact is generated on each active zone.

Thus, it is for example possible to measure the amplitude and the phase of the signal for m predetermined frequencies (m being a natural integer at least equal to 1) and to compare these measured amplitudes a1-am and these measured phases p1-pn with the measured amplitudes Ai1-Aim and the measured phases Pi1-Pim at said predetermined frequencies based on signals received during the learning phase (or determined by modeling) for the various active zones 10 numbered i (i being between 1 and n, where n is the number of active zones 10).

As a variant, it is possible to determine a code from said data extracted from the sensed signal and to compare this code with a table which gives a correspondence between at least certain codes and each active zone (the codes contained in this table then represent the predetermined signals from the abovementioned library of signals).

As a nonlimiting example, a 16-bit code can be determined from the sensed signal S(t) in the following manner:

- the first 8 bits of the code are determined from the frequency spectrum of the signal S(t) that is subdivided into 8 predetermined frequency tranches $[f_k, f_{k+1}]$, $k=1 \ldots 8$: the bit of rank k is equal to 1 for example if the final energy value given by the spectrum at frequency $f_{k+1}$ is greater than the average energy value of the acoustic wave in the frequency tranches $[f_k, f_{k+1}]$ and this bit is 0 otherwise;
- the last 8 bits of the code are determined from the temporal signal S(t) that is subdivided into 9 predetermined temporal tranches $[t_k, t_{k+1}]$, $k=1 \ldots 9$: the bit of rank k+8 is equal to 1 for example if the average value of the signal power during the period $[t_k, t_{k+1}]$ is greater than the average value of the signal power during the period $[t_k, t_{k+2}]$, $k=1 \ldots 8$, and this bit is 0 otherwise.

In this particular example, the codes in the correspondence table would be determined during the learning phase, by computing as indicated above the codes that correspond to the signals sensed by the acoustic sensor 6 when impacts are generated on the different active zones 10.

Figure 4:
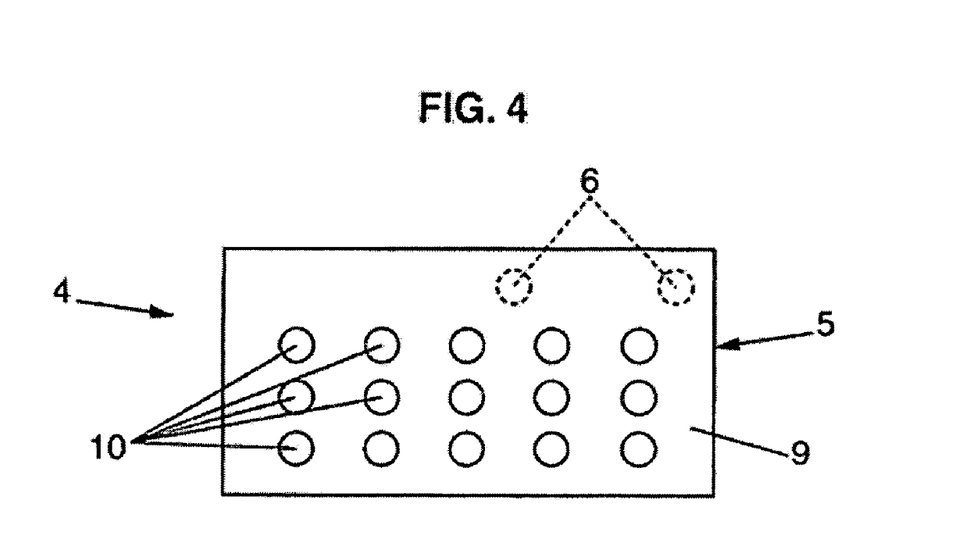
FIG. 4 depicts schematically an acoustic interface that can be used in a device for implementing a method according to a second embodiment of the invention.
Figure 5:
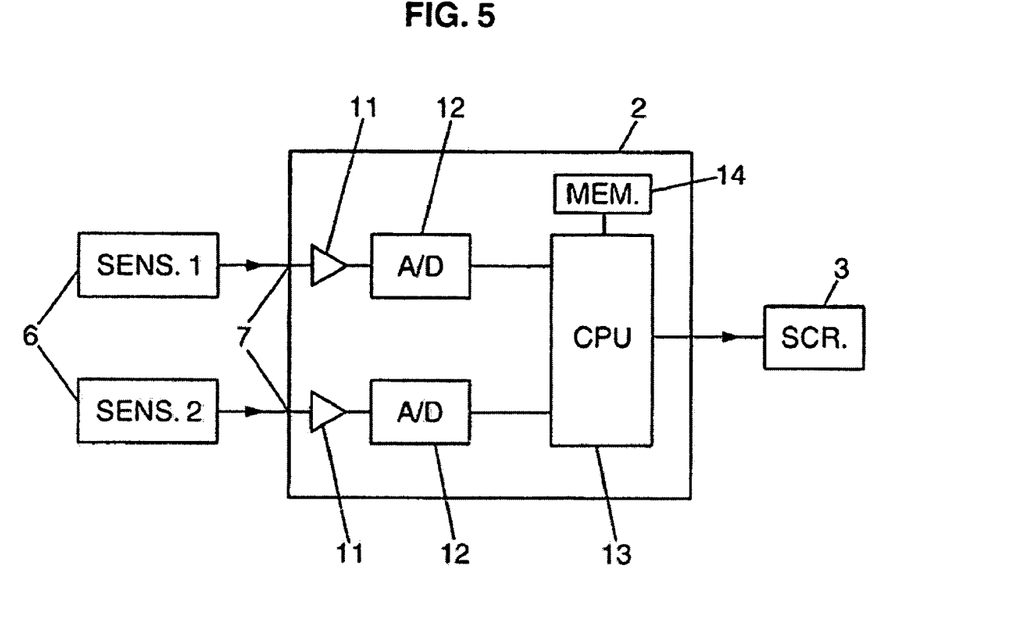
FIG. 5 is a block diagram of an exemplary device that can use the input interface of FIG. 4, and FIGS. 6 to 9 depict schematically acoustic interfaces that can be used in a device for implementing a method according to third, fourth and fifth embodiments of the invention.

Furthermore, as shown in FIGS. 4 and 5, it may be possible to use two acoustic sensors 6 (SENS.1 and SENS.2), particularly when the object 5 has symmetries such that there may be a risk of confusion between the signals originating from two different active zones 10. Where appropriate, more than two acoustic sensors 6 may be used, although the preferred solutions call for one or two sensors 6.

When two or more sensors are used, two choices are possible:

1) mixing of the signals of the various sensors and processing of the global signal according to the method described above, 2) or, preferably, individual processing of the signals of the various sensors with the method described above and a cross-checking of the results:

if the active zones 10 determined from the various sensors have identical numbers, then it is determined that the zone that received an impact is the latter, in the other cases, it is possible either to consider the sensed signal to be a false alarm or to determine the zone that received an impact for example by intercorrelation between the intercorrelation functions Ci(t) determined for each sensor or by more complex means such as neural networks or others.

It will be noted that the two acoustic sensors may be of different types and/or sense different magnitudes and/or their signals may be processed differently to identify the active zones 10 receiving impacts. For example, one of the acoustic sensors may be used to record the received signal S(t), while the other may be used only to determine a temporal difference between the arrival of the acoustic wave at the two sensors.

The second sensor might furthermore not sense the acoustic wave propagated in the solid object 5, but the acoustic wave propagated in the air at the time of the impact.

Figure 6:
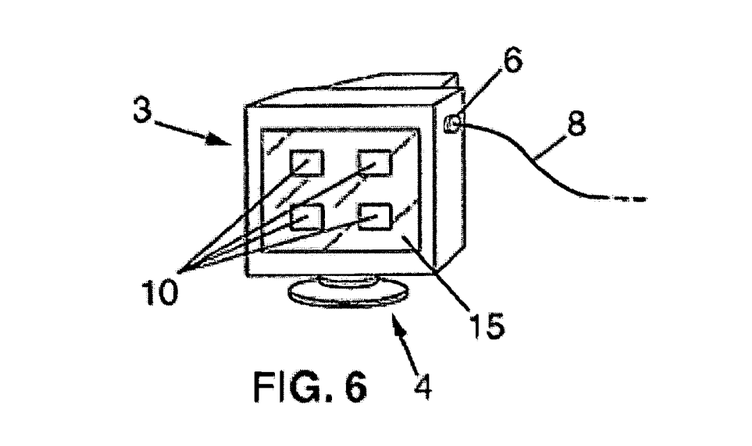

As shown in FIG. 6, the object forming an acoustic interface may consist of the computer screen 3 or a television screen to which the sensor 6 is attached. The surface receiving the impacts may advantageously be the pane 15 of the screen, which could in particular be used to have the screen 3 display the delimitation of the active zones 10 and their meaning. This variant could be used for example to program a video cassette recorder, particularly when the screen 3 is a television screen (the central processing unit 2 would then be replaced by the video cassette recorder).

Figure 7:
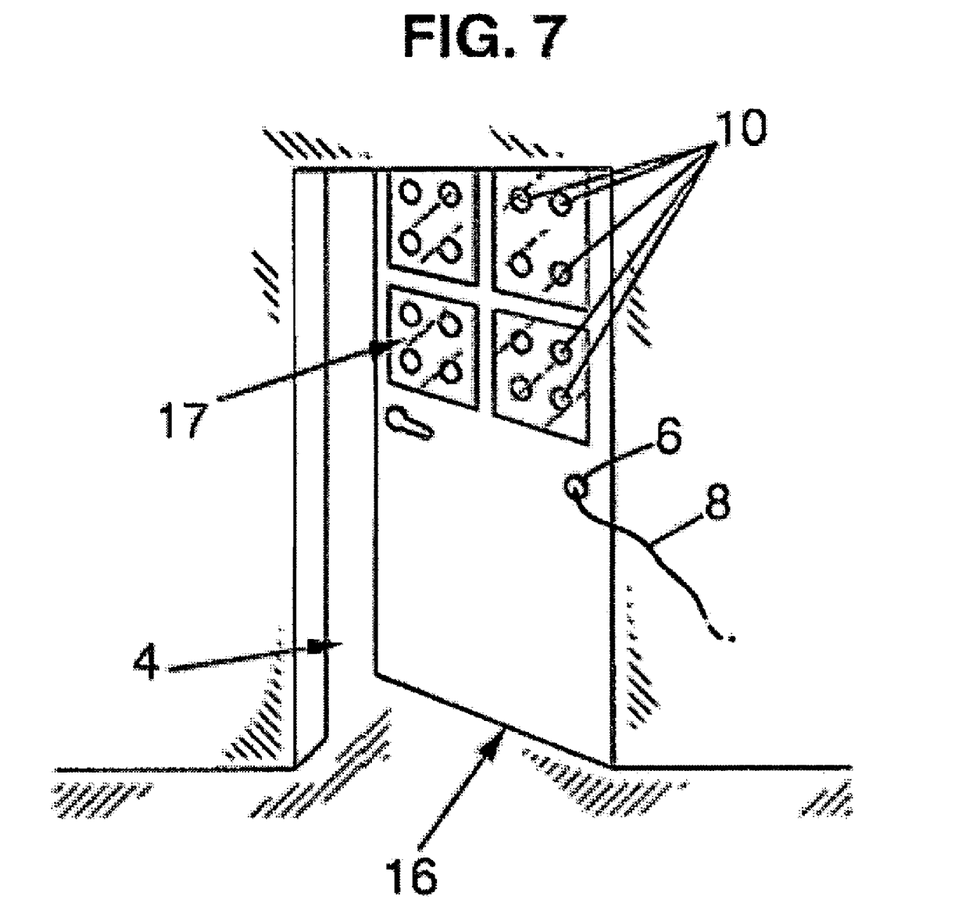

As shown in FIG. 7, the object forming an acoustic interface may also consist of a glass paneled door 16 or similar. In the example shown in FIG. 7, the surface 17 which supports the active zones 10 consists of the glazed surface of the door, and, still in the particular example shown in this figure, the acoustic sensor 6 is attached to a wooden portion of the door 16.

Figure 8:
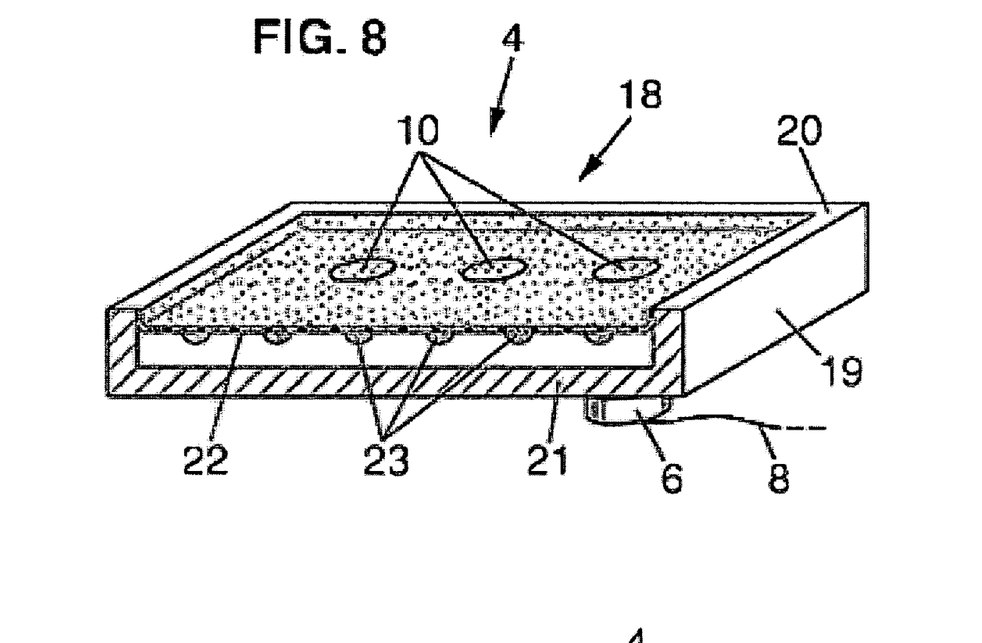

In the example shown in FIG. 8, the object forming an acoustic interface is a tray 18 designed especially to serve as an acoustic interface. This tray may for example comprise a rigid frame 19 secured to a base 20, also rigid, which supports the acoustic sensor 6.

A flexible membrane 22, made for example of elastomer, is stretched over the frame 19 a short distance above the base 21. This flexible membrane 22 is provided with rigid protrusions 23 under its bottom face (these may for example be glass hemispheres that are bonded beneath the membrane 22). Thus, when a user taps on the membrane 22 and particularly on an active zone 10 supported by this membrane, this action generates an impact of at least one protrusion 23 on the bottom 21 of the frame of the tray 18. This variant has the advantage of producing impacts that are less dependent on the manner in which the user taps on the membrane 22 (with the finger or the nail or a tool, with more or less force, etc.).

In the embodiments in FIGS. 6 to 8, the method implemented may be identical or similar to that described previously and may be used to provide a correspondence of an impact generated on the surface of the object forming an acoustic interface either with an active zone 10 or with no active zone.

But it is also possible, in all the embodiments of the invention using several active surfaces (point-like where necessary), to determine the position of the impact on the surface 9 of the object 5 forming an acoustic interface (see the example in FIG. 9), even when that impact is not on one of the active zones. A continuous or pseudo continuous acoustic interface is thus obtained (making possible an operation similar for example to a computer mouse, to a light pen, to a touch-sensitive screen or similar).

Figure 9:
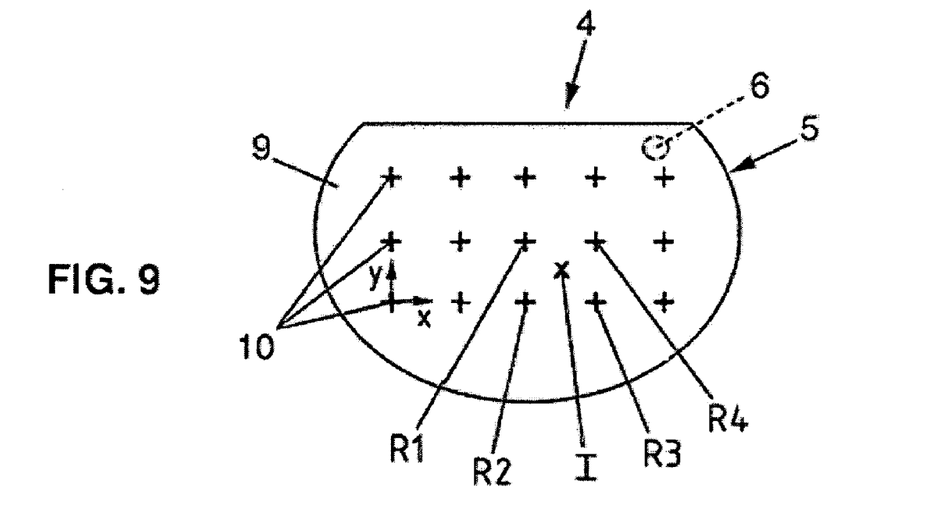

In this case, during the recognition step:

resemblance values representative of the resemblance between the sensed signal and the predetermined signals are determined (particularly values originating from the abovementioned intercorrelation functions Ci(t), for example their maxima D(i) defined above), the impact is associated with a number p at least equal to 2 of adjacent active zones corresponding to a maximum resemblance, called reference active zones R1-R4 (p may advantageously be 4 particularly for positioning the impact according to two dimensions x, y, or where appropriate less than 4 particularly if the impact is to be positioned only according to a single dimension x or y): for example, the zone R1 can first be determined as being the active zone 10 having the maximal resemblance value D(i), and then, from the active zones adjacent to R1, the three zones R2-R4 can be determined which give the highest values of the resemblance value D(i));

then the position of the impact I on the surface 9 is determined as a function of the resemblance values D(i) attributed to the reference active zones R1-R4.

During this last step, advantageously it is possible to determine the position of the impact on the surface such that the resemblance values attributed to the reference active zones correspond as well as possible to theoretical resemblance values computed for said reference active zones for an impact generated in said position on the surface.

These theoretical resemblance values may in particular be functions of the position of the impact on the surface, determined in advance for each possible set of reference active zones.

The functions in question may be determined during the learning step, for example by adjusting a typical function on the values of resemblance between the active zones. The typical function in question may depend on the shape of the object and be determined in advance, either theoretically or experimentally.

To take a practical example, the function of theoretical resemblance $Rth(X,Y)$ between two points X, Y of the surface 9 may correspond to the maximum of the function of intercorrelation between the signals $Sx(t)$ and $Sy(t)$ sensed by the sensor 6 respectively when impacts are generated at these two points X, Y, and this function may for example be of the type $Rth(X, Y)=(\sin(a(\beta).d))/(a(\beta).d)$, approximated for example by $Rth(X, Y)=1-[a(\beta).d]^2/6$, where:

d is the distance between X and Y, $\beta$ is an angle between for example the x axis (or y axis) and the direction X-Y, and $a(\beta)$ is a coefficient dependent on the angle $\beta$ according to an elliptical function:

$$a(\beta)=a1.\cos(\beta+\beta 0)+a2.\sin((\beta+\beta 0),$$

where $\beta 0$ is an angle representative of the orientation of the ellipse.

The Rth function can be determined for each possible set of active reference zones R1-R4, from predetermined signals Ri(t) from the library of signals, sensed by generating impacts respectively on the reference active zones during the learning phase.

Accordingly, for a given set of four reference zones R1-R4, the maximum intercorrelation function of the signal R1(t) corresponding to R1 can be computed, with each of the signals R2(t), R3(t), R4(t) corresponding to the zones R2-R4. From this are deduced the values of a1, a2 and β0. The same process can then be performed from the reference zones R2, R3 and R4, which on each occasion gives the values of a1, a2 and β0, then the average of the four values thus found respectively for a1, a2 and β0 can be averaged: these averaged values then determine the function Rth for all the reference zones R1-R4. As a variant, the function Rth could be determined by an iterative optimization process (of the least squares method type) to minimize a function of error between the function of theoretical resemblance and the maxima of the functions of intercorrelation between the signals R1(t), R2(t), R3(t) and R4(t) taken two at a time.

When the abovementioned theoretical resemblance functions Rth have been determined, when seeking to determine the position of an impact I between four adjacent active zones R1-R4 (advantageously point-like), this position can for example be determined by an iterative optimization process by minimizing a function of error between the values D(i) previously defined D(i)=Max(Ci(t)), with i here being the number of the reference active zone RI in question) and the values of theoretical resemblance Rth(I, Ri). For example, a function of error E equal to the sum of the values $(D(i)-Rth(I, Ri))^2$ can be minimized.

The method that has just been described is of course not limited to the examples that have just been described; it has many applications, amongst which:

- the use of panes or other surfaces as an input interface 4, in shops, museums, art galleries, or other places to allow the clients or the visitors to display details on a screen or via a loudspeaker concerning the products or works exhibited,
- the use of panes or other surfaces of display panels as input interfaces 4, allowing passers-by to display for example details on the publicity items being displayed, or to display general information concerning a community or another place (for example news or practical information, for example a plan of the location), or other, these details or information being displayed for example on a screen visible in the lower portion of the display panel,
- the use of portions of walls, of the ground, or of any other object as an input interface 4 for example for controlling home automation systems (residents of an apartment can thus in particular themselves determine the positions of the switches, consisting simply of the abovementioned active zones 10, positioned on the walls or other places as required),
- the use of portions of walls, of the ground, or of any other object as an input interface 4 for example for controlling industrial machines particularly in dangerous environments (places containing explosives, places with high temperature, places with high radioactivity, etc.),
- the use of smooth and easily maintained surfaces as an input interface 4, in order to constitute input keyboards of domestic objects such as refrigerators, washing machines or other,
- the use of panels on building doors as input interfaces 4, forming for example virtual digicode keyboards,
- the use of the ground to locate the position of a person walking on it,
- the production of keyboards or control panels unaffected by pollution, bad weather or other external attacks, in industrial, military or even domestic applications (the acoustic sensor or sensors may where necessary be fully integrated into the object serving as the input interface, in particular if it is an object at least partially molded in plastic material); when these input interfaces are to control a device (for example a microcomputer), comprising a display screen, the keyboard or acoustic control panel may consist of the screen itself or a transparent surface covering that screen,
- the production of input interfaces in automobiles or other vehicles.

It will furthermore be noted that the previously described input interface 4 could be provided with processing means for locally performing the recognition of acoustic signals S(t) originating from the active zones 10, the input interface 4 then sending directly to the central processing unit 2, or to any other user electronic apparatus, only coded signals indicating directly which active zone 10 has been touched by the user and, where appropriate, information relating to the impact: force of the impact and nature of the impact.

It will be noted that the method according to the invention does not require the object 5 to have a homogeneous or predetermined structure, or be made with a particular care, or be made with very precise dimensions, or with specific surface states. On the contrary, the more the object 5 is heterogeneous and/or irregular, the more the acoustic signals emitted by the different active zones 10 will be different from one another and the better the acoustic signals will be recognized. In certain cases, heterogeneities can even be intentionally created such as cavities or others in the object 5 to facilitate recognition of the acoustic signals originating from the active zones 10.

Furthermore, when the predetermined signals from the library of signals are determined during a learning phase, it is possible to use a piezoelectric sensor connected by any known means to a central processing unit 2 and fixed either to the finger of the user, or to the object (stylet or other) used to generate impacts on the active zones of the object 5. In this case, the impulse signal generated by the piezoelectric sensor at the time of each impact can be used to trigger the acquisition of the predetermined acoustic signal intended to feed the library of signals, and/or can be used to measure the intensity of the impact, this measurement of intensity being able to be used for example to invalidate certain acquisitions of predetermined signals in particular when the intensity is below a predetermined threshold or when this intensity does not fall within a predefined period.

Furthermore, when the predetermined signals from the library of signals are determined during a learning phase, it may be advantageous to retain only the sensed acoustic signals whose amplitude is greater than a relatively high first reference threshold. In this case, during the normal operation of the device, account can thereafter be taken of the acoustic signals whose amplitude exceeds a second predetermined threshold clearly lower than the first threshold. The first predetermined threshold may thus be equal to several times (at least two to three times) the average temporal value of the absolute amplitude of the ambient noise, measured for example over several seconds, whereas the second predetermined threshold may for example be equal to 1.5 times that average value. In this manner, only good quality reference signals are recorded during the learning phase, while retaining a great sensitivity of the device during its normal operation.

Where appropriate, the central processing unit 2 may be provided with an auxiliary programming keyboard (not shown) which may be used in particular during the learning phase to indicate for example what type of signal is generated. This type of generated signal may in particular be one of the following types:

new signal replacing one of the reference signals from the library of signals (the identification of the replaced reference signal may thus be communicated to the central processing unit 2 by means of the auxiliary keyboard), new reference signal (either for a preexisting but incomplete reference library, or for a new reference library corresponding in particular to new conditions of temperature, humidity or state of the object 5), new signal intended to verify a reference signal that already exists in a library of signals.

Furthermore, when the predetermined signals from the library of signals are determined during a learning phase, provision may be made where appropriate to validate the reference signals from that library only when they are confirmed by generation of one or more impact(s) on the same active zone, within a predetermined elapsed time following the generation of a first impact.

When the predetermined signals from the library of signals are determined during a learning phase, the impacts generated on the object 5 during this learning phase may be generated:

either with a hard object such as a stylet, in which case the same stylet will preferably be used during the normal operation of the device, or with a more shock-absorbent object such as for example a hard plastic rubber attached to the end of a pen or similar (the inventors have thus been able to obtain good results with a "Staedler" brand of hard plastic rubber for transparencies), in which case the impacts on the object 5 may then be generated just as well with relatively hard objects as with less hard objects (fingernail, finger pad or other) during the normal operation of the device.

Furthermore, as a variant of the method previously described to recognize the active zone 10 from which the sensed signal S(t) comes, it is possible to use the following method:

(1) during the learning phase, the Fourier transform $R_i(\omega)$ is computed for each acoustic signal $R_i(t)$ generated by an impact on the active zone i, where i is an index lying between 1 and n:

$$R_i(\omega) = |R_i(\omega)| \cdot e^{j\phi i(\omega)}$$

From this Fourier transform, only the phase component is retained, only in the frequency bands ω in which the amplitude of the spectrum is greater than a predetermined threshold.

The frequency shape of the reference signal retained is therefore expressed in the form $R'_i(\omega) = e^{j\phi i(\omega)}$ for the frequencies ω at which $|R_i(\omega)|$ is greater than the predetermined threshold and $R'_i(\omega) = 0$ at the other frequencies ω.

The predetermined threshold in question may for example be equal to the maximum of MAX/D and of $|B(\omega)|$, where:

MAX may be either the maximal value of $|R_i(\omega)|$, or the maximal value of the modules $|R_i(\omega)|$ each normalized in energy, or the maximal value of the envelope of the average of the modules $|R_i(\omega)|$ each normalized in energy, D is a constant, for example equal to 100, $|B(\omega)|$ is the average of several noise spectra in the object 5, acquired at different times.

(2) During the normal operation of the device, each sensed signal S(t) undergoes the same process as in step (1) above, such that a signal $S'(\omega) = e^{j\psi(\omega)}$ is obtained for the frequencies ω at which $|S(\omega)|$ is greater than the abovementioned predetermined threshold, $S'(\omega)$ being equal to 0 at the other frequencies.

(3) Then a product $P_i(\omega)$ is computed equal to $S'(\omega)$ multiplied by the conjugate of $R'_i(\omega)$ for i=1 ... n.

(4) The products $P_i(\omega)$ are normalized by dividing them by their integrals.

(5) Then the inverse Fourier transform of all the products $P_i(\omega)$ is carried out and temporal functions $X_i(t)$ are obtained.

According to the different functions $X_i(t)$, and particularly according to their maximum, the signal S(t) can then be attributed to one of the active zones 10. As an example, the maximal value (as a relative value or absolute value) can be computed of the different functions $X_i(t)$ and the signal S(t) can be attributed to the active zone i which corresponds to the function $X_i(t)$ with the greatest maximum. Where necessary, the maximum of the function $X_i(t)$ retained can also be compared with a threshold defined in advance, for example equal to 0.6, and it can be decided that the signal S(t) should be attributed to the zone i when the maximum of $X_i(t)$ is greater than this threshold (if several functions $X_i(t)$ have their maximum greater than 0.6, only the function $X_i(t)$ with the greatest maximum is then retained).

It is possible where necessary to verify that the attribution of the signal S(t) to the active zone i is correct, for example by computing a value $MM_i = M_i/M$ where $M_i$ is the maximum of the absolute value of $X_i(t)$ and M is the average value of all the values $M_i$. The attribution of the signal S(t) to the active zone i may then be considered to be correct if that value $MM_i$ is greater than a certain limit, equal for example to 1.414.

It will also be noted that the abovementioned values $MM_i$ may be computed by replacing $S'(\omega)$ with $R'_i(\omega)$, in order to obtain information on the spatial resolution of the active zones. In particular, it can thus be verified that an active zone with index i does not risk being confused with another, by verifying that the corresponding value $MM_i$ is greater than a predetermined limit, for example greater than 1.414.

Furthermore, it is also possible to take account of different environmental parameters (temperature, relative humidity, mechanical stresses, etc.) by modifying the predetermined signals from the library of signals as a function of the environmental parameter or parameters.

Accordingly, use can be made of one of the following correction methods:

linear temporal dilation or contraction of the reference signals from the library of signals: in this case, the reference signals $R_i(t)$ from the library of signals are replaced by signals $R_i(\alpha)$, where α is a non null positive multiplier coefficient which is a function of the environmental parameters, this coefficient ax being able to be determined theoretically or experimentally for a given material, or experimentally for each object 5;

linear temporal dilation or contraction of the sensed signals S(t): in this case, the reference signals $R_i(t)$ are left unchanged, but the sensed signal S(t) is replaced by S(αt) where α is a coefficient as defined above;

nonlinear dilation or contraction in frequency of the reference signals: in this case, the frequency signals $R'i(\omega)$ are replaced by $R'_i(\omega')$, with $$\omega' = \frac{\omega \beta^2}{1 + \sqrt{(\omega/\omega_N) \cdot (\beta - 1)}},$$

where $\omega_N$ is equal to half the sampling frequency of the processing device, and $\beta$ is a coefficient determined theoretically or experimentally;

nonlinear dilation or contraction in frequency of the sensed signal S(t): in this case, the reference signals from the library of signals are left unchanged, and the signal S'($\omega$) is replaced by S'($\omega$'), $\omega$' being defined above.

In the two abovementioned cases of nonlinear dilation or contraction in frequency, it is possible also to use an averaged correction of phase, in which case the signals $R_i(\omega')$ are replaced by $R_i(\omega')$. M'($\omega$)/N'($\omega$) or the signals S($\omega$') are replaced by S($\omega$'). M'($\omega$)/N'($\omega$). In one or other of these formulae, N'($\omega$)=M($\omega$)/|M($\omega$)|, and N'($\omega$)= N($\omega$)/|N($\omega$)|, M($\omega$) being equal to the average of all the $R_i(\omega)$ and N($\omega$) being equal to the average of all the $R_i(\omega')$ The various abovementioned corrections of the reference signals $R_i(\omega)$ or of the sensed signal S($\omega$) may be made either automatically by the central processing unit 2, particularly as a function of information given by one or more sensors (not shown), or manually by the user.

Furthermore, it will be noted that the central processing unit 2 may comprise several libraries of reference signals suitable for different values of the environmental parameters.

Furthermore, to suit the types of impacts generated when the device is used, and particularly to suit the use either of a finger of the user, or of another object to generate the impacts, it may be advantageous to request the user to generate impacts on one or more predetermined active zones 10, for example two active zones of indices m and p. Thus two temporal signals $S_m(t)$ and $S_p(t)$ are sensed, their Fourier transforms $S_m(\omega)$ and $S_p(\omega)$ are computed and then the average $M_1(\omega)$ of the following two terms is computed:

($R_m(\omega).|S_m(\omega)|)/(|R_m(\omega)|.S_m(\omega))$, and ($R_p(\omega).|S_p(\omega)|)/(|R_p(\omega)|.S_p(\omega))$.

This average $M_1(\omega)$ is then used in step (3) previously defined to replace the product $P_i(\omega)$ with $M_1(\omega).P_i(\omega)$, this product then being used instead of $P_i(\omega)$ in step (4).

Furthermore, it will be noted that the invention allows a user to define active zones at will and the central processing unit 2 may be suitable for keeping active this definition of the active zones only when the object 5 is effectively being used as an acoustic interface. In this case, the abovementioned definition of the active zones is erased by the central processing unit 2 after a certain period of nonuse of the device.

It will also be noted that the function generated by an impact on an active zone may be modulated where appropriate as a function of the intensity of that impact.

It will also be noted that, when the object 5 exhibits resonance phenomena which cause prolonged propagations of acoustic waves on each impact on the active zones, it may be advantageous to raise the threshold of detection of the acoustic signals S(t) (for example up to 0.5 times the maximal value admissible by the electronic system for acquisition of the signal S(t)) when a signal S(t) has been detected, then to lower this detection threshold again (notably in exponential manner) to its normal level: thus, multiple detections of one and the same impact are avoided.

It will be noted that, in all the embodiments of the invention, it would where necessary be possible to define a single active zone on the object 5, in which case it is nevertheless possible to code several functions on that single active zone, for example according to the number of impacts generated consecutively on the same zone.

Furthermore, the active zones 10 may where necessary not be defined in advance, but simply be defined as a function of the successive impacts received during the use of the device. Thus, the device can for example be designed to comprise three active zones, which are each simply defined on the receipt of a first impact on each zone, and which are then recognized as "first zone", "second zone", and "third zone", on receipt of the subsequent impacts.

Furthermore, when the active zones are very numerous, use can be made where necessary of an automated device to generate the reference signals stored in the library of signals during the learning phase. This automated device could for example comprise a system of movement on two dimensions, comprising two step motors, to move for example an excitation stylet or similar to the surface of the object 5 and to generate impacts by means of this stylet, actuated for example by a solenoid, on the various active zones.

Still in the situation where the active zones 10 are extremely numerous, it may be possible to divide them into several resemblance groups. In this case, during normal use of the device, when an impact generates a signal S(t), a first process is used to attach this signal S(t) to one of the resemblance groups, then a refined process is used to assign this signal S(t) to one of the active zones in this resemblance group.

It will also be noted that the same central processing unit 2 could where necessary process the signals originating from several objects 5. In addition, it is also possible to interface the acoustic sensor or sensors directly with a network, particularly an IP network, in order to direct the sensed signals to a single IP address from which these signals can be exploited by any computer connected to the IP network.

The invention claimed is:

1. A method for locating a position of an impact on a surface of an object forming an acoustic interface, the surface provided with at least one acoustic sensor, the method comprising:

measuring at least one sensed signal from acoustic waves generated in the object forming an acoustic interface by said impact;

localizing said position of said impact on said surface by processing of said at least one sensed signal, the processing characterized by a comparison of a sensed signal in the at least one sensed signal with at least one predetermined signal in a plurality of predetermined signals, wherein each respective predetermined signal in said plurality of predetermined signals corresponds to an active zone in a plurality of active zones on said surface, and each respective predetermined signal in said plurality of predetermined signals represents a signal that is sensed when a reference impact is generated on the active zone in said plurality of active zones that corresponds to the respective predetermined signal, and wherein, the position of the impact is associated with an active zone in said plurality of active zones by said localizing when the sensed signal is sufficiently similar to said predetermined signal corresponding to the active zone.

2. The method of claim 1, wherein said localizing comprises comparing the sensed signal with said plurality of predetermined signals, each respective predetermined signal in said plurality of predetermined signals corresponding to a signal sensed when an impact is generated on a corresponding one of said active zones in said plurality of active zones.

3. The method of claim 1 wherein
said at least one acoustic sensor comprises a plurality of acoustic sensors;
said at least one sensed signal comprises a plurality of sensed signals, wherein each sensed signal in said plurality of sensed signals is detected by a different acoustic sensor in said plurality of acoustic sensors; and
said localizing comprises comparing, using a first comparison technique, a first sensed signal in the plurality of sensed signals with one or more predetermined signals in said plurality of predetermined signals that were measured using the same acoustic sensor that sensed said first sensed signal, wherein said comparing of said first sensed signal is performed independent of all other comparisons of sensed signals.

4. The method of claim 3, wherein said localizing further comprises comparing, using a second comparison technique, a second sensed signal in the at least one sensed signals with one or more predetermined signals in said plurality of predetermined signals that were measured using the same acoustic sensor that sensed said second sensed signal, wherein said first comparison technique and said second comparison technique are different from one another.

5. The method of claim 1, wherein said at least one acoustic sensor comprises a plurality of acoustic sensors that sense said at least one sensed signal at several different magnitudes.

6. The method of claim 1 wherein said at least one acoustic sensor consists of one acoustic sensor or two acoustic sensors.

7. The method of claim 1 wherein said at least one acoustic sensor consists of a single acoustic sensor.

8. The method of claim 1, the method further comprising:
experimentally determining a predetermined signal in said plurality of predetermined signals, said experimentally determining comprising:
(i) generating at least one impact in an active zone on the surface of said object, said active zone corresponding to the predetermined signal; and
(ii) measuring a signal caused by the at least one impact using one or more acoustic sensors in said at least one acoustic sensor.

9. The method of claim 1, the method further comprising:
(i) generating at least one impact in an active zone on a surface of a reference object that is identical to or very similar to said object, said active zone corresponding to the predetermined signal; and
(ii) measuring a signal caused by the at least one impact using one or more acoustic sensors in said at least one acoustic sensor.

10. The method of claim 1, wherein said comparison of said at least one sensed signal with said at least one predetermined signal comprises comparison by intercorrelation.

11. The method of claim 1, wherein said comparison of said sensed signal with said at least one predetermined signal comprises comparison by voice recognition, signal recognition, shape recognition or recognition by a neural network.

12. The method of claim 1 wherein said position of said impact is associated with either (i) a unique active zone in said plurality of active zones or (ii) no active zone in said plurality of active zones.

13. The method of claim 1, wherein each active zone in said plurality of active zones corresponds to a predetermined information element and, when the position of the impact is associated with an active zone, an electronic device is made to use the predetermined information element corresponding to the active zone.

14. The method of claim 1, wherein the surface of the object forming an acoustic interface comprises a plurality of active zones and the localizing comprises:
performing a respective intercorrelation between the sensed signal $S(t)$ and each said predetermined signal $R_i(t)$ in said at least one predetermined signals, wherein i is a natural integer between 1 and n and wherein i designates an active zone in said plurality of active zones, thereby obtaining one or more respective intercorrelation functions $Ci(t)$;
determining a potentially activated active zone j corresponding to an intercorrelation function $Cj(t)$, in the one or more respective intercorrelation functions $Ci(t)$, wherein the intercorrelation function $Cj(t)$ has a maximum amplitude greater than those of the other intercorrelation functions $Ci(t)$;
determining the distribution $D(i)$ of the amplitude maxima of the intercorrelation functions wherein:

$$D(i)=\text{Max }(Ci(t));$$

determining the distribution $D'(i)$ of the amplitude maxima of the intercorrelation function $C'i(t)$ between (i) the predetermined signal corresponding to the potentially activated zone, $Rj(t)$, and (ii) each respective predetermined signal $Ri(t)$ wherein:

$$D'(i)=\text{Max}(C'i(t));$$

computing an intercorrelation between $D'(i)$ and $D(i)$; and
determining whether the impact was generated on the active zone j as a function of a level of correlation between the distributions $D(i)$ and $D'(i)$ computed by said intercorrelation between $D'(i)$ and $D(i)$.

15. The method of claim 1, the method further comprising:
extracting data from a sensed signal in said at least one sensed signal representative of a sensed characteristic of the sensed signal;
extracting data from a predetermined signal in said plurality of predetermined signals representative of a reference characteristic of the predetermined signal; and
wherein
said comparison of the sensed signal with the least at one predetermined signals comprises comparing the sensed characteristic to the reference characteristic.

16. The method of claim 15 wherein said sensed characteristic is formulated as a first code and wherein said comparison of the sensed signal with the at least one predetermined signals comprises comparing the first code with a table of codes, wherein each code in said table of codes represents data from a predetermined signal corresponding to an active zone in said plurality of active zones.

17. The method of claim 1, wherein the object forming an acoustic interface comprises a plurality of active zones and wherein said localizing comprises
determining a plurality of resemblance values, each resemblance value representative of a resemblance between the sensed signal and a predetermined signal in said plurality of predetermined signals;

associating the position of the impact (I) with a plurality of adjacent active zones as a function of said plurality of resemblance values; and identifying the position of the impact (I) on the surface based on a function of the resemblance values attributed to the plurality of adjacent active zones associated with said impact.

18. The method of claim 17, wherein said identifying the position of the impact (I) on the surface based on said function comprises correlating the resemblance values corresponding to the plurality of adjacent active zones to one or more theoretical resemblance values computed for said plurality of adjacent active zones for an impact generated in said position on the surface.

19. The method of claim 18, wherein a theoretical resemblance value in said one or more theoretical resemblance values is a function of the position of the impact on the surface wherein said function is determined prior to said localizing for said plurality of adjacent active zones.

20. The method of claim 1 wherein said comparison of the sensed signal with at least one predetermined signal in the plurality of predetermined signals comprises comparing a phase of a predetermined signal in the plurality of predetermined signals with a phase of the sensed signal.

21. The method of claim 20, the method further comprising:

computing a Fourier transform $R_i(\omega)=|R_i(\omega)|\cdot e^{j\Phi i(\omega)}$ of a predetermined signal in the plurality of predetermined signals that corresponds to an active zone i in said plurality of active zones;

computing a Fourier transform $S(\omega)=S(\omega)|\cdot e_{j\ \varphi i(\omega)}$ of a sensed signal in the at least one sensed signals; wherein said comparison of the sensed signal in the at least one sensed signal with said at least one predetermined signal in the plurality of predetermined signals comprises comparing:

$S'(\omega)$ to $R'_i(\omega)$ wherein, $S'(\omega)$ is the phase component of the Fourier transform of the sensed signal for those frequency bands ω in which the amplitude $|S(\omega)|$ is greater than a predetermined threshold; and $R'_i(\omega)$ is the phase component of the Fourier transform of the predetermined signal for those frequency bands ω in which the amplitude $|R_i(\omega)|$ is greater than a predetermined threshold.

22. The method of claim 21, wherein the predetermined threshold is equal to the maximum of MAX/D and $|B(\omega)|$, where:

MAX is the maximal value of the amplitude $|R_i(\omega)|$, the maximal value of amplitude $|R_i(\omega)|$ normalized in energy, or the maximal value of an envelope of an average of amplitude $|R_i(\omega)|$ normalized in energy, D is a constant, and $|B(\omega)|$ is an average of a plurality of noise spectra in the object forming an acoustic interface, acquired at different times.

23. The method of claim 21, the method further comprising:

computing, for each active zone i in the plurality of active zones, $Pi(\omega)=SN(\omega)$ multiplied by the conjugate of $RN(\omega)$;

normalizing, for each active zone i in the plurality of active zones, $Pi(\omega)$;

obtaining a plurality of temporal functions, each temporal function $Xi(t)$ in said plurality of temporal functions corresponding to an active zone i in the plurality of active zones, wherein $Xi(t)$ for a respective active zone i is an inverse Fourier transform of the product $Pi(\omega)$ for the respective active zone; and attributing the signal $S(t)$ to an active zone in the plurality of active zones as a function of said temporal functions.

24. The method of claim 23, wherein the signal S(t) is attributed to the active zone corresponding to a temporal function having a maximum value that is greater than the maximum value of any other temporal function in said plurality of temporal functions.

25. A device for locating a position of an impact on a surface forming part of an object forming an acoustic interface, provided with at least one acoustic sensor the device comprising:

means for measuring at least one sensed signal from acoustic waves generated in the object forming said acoustic interface by said impact, and means for localizing the position of the impact on said surface by processing a sensed signal in said at least one sensed signals, characterized in that said means for localizing comprises:

recognition means suitable for comparing the sensed signal with at least one predetermined signal, each respective predetermined signal in said at least one predetermined signal corresponding to a signal that is sensed when an impact is generated on an active zone forming part of the surface of the object that corresponds to the respective predetermined signal, and means for associating the location of the impact with said active zone when the sensed signal is sufficiently similar to said predetermined signal.

26. The method of claim 3, the method further comprising repeating said localizing for each respective sensed signal in the plurality of sensed signals.

27. The method of claim 1, wherein said object is a pane, a door, a window, a portable tray, a computer screen, a display panel, an interactive terminal, a toy, a vehicle dashboard, a rear of a front seat back of an automobile vehicle, a rear of an airplane seat, a wall, a floor, or a vehicle fender.

28. The method of claim 1 wherein a sensor in said at least one sensor is a piezoelectric sensor, a capacitive sensor, a magnetostrictive sensor, an electromagenetic sensor, an acoustic velocimeter, or an optical sensor.

29. The method of claim 1 wherein an active zone in said plurality of active zones is delimited on said surface by a physical marking.

30. The method of claim 1 wherein an active zone in said plurality of active zones is delimited by projecting an image onto said surface.

31. The method of claim 13 wherein the predetermined information element is a command, a digit, a letter, or a position on said surface.

32. The method of claim 1 wherein said plurality of active zones comprise a virtual keyboard and wherein said impact is caused by hitting an active zone in said plurality of active zones with an objected selected from the group consisting of a fingernail, a fingertip, a pen, or a style.

33. A method of identifying a location of an impact on a surface of an object, wherein said surface is delineated into a plurality of active zones, the method comprising:

measuring a sensed signal caused by said impact;

comparing said sensed signal with a library of predetermined signals, each predetermined signal in said library of predetermined signals corresponding to an active zone in said plurality of active zones, wherein each predetermined signal in said library of predetermined signals is determined experimentally by generating at least one impact on each active zone in the plurality of active zones; wherein when a correspondence between said sensed signal and a respective predetermined signal in said plurality of sensed signals is sufficiently similar, said location of said impact is deemed to be in the active zone corresponding to said respective predetermined signal.

34. The method of claim 33 wherein said comparing comprises intercorrelating said sensed signal with a predetermined signal in said library of predetermined signals.

35. The method of claim 33 wherein said sensed signal is normalized prior to said comparing.

36. The method of claim 33, the method further comprising:

converting said sensed signal to a sensed code representative of said sensed signal and wherein said library of signals comprises a plurality of predetermined codes, each predetermined code representing a different signal in said plurality of predetermined signals; and wherein said comparing comprises comparing said sensed code with a predetermined code in said plurality of predetermined codes.

37. The method of claim 36, wherein said sensed code is a 16-bit code wherein (a) the first eight bits of said 16-bit code are determined by a frequency spectrum of the sensed signal that is subdivided into eight predetermined frequency tranches [$f_k$, $f_k$], wherein k=1 ... 8 and wherein the bit of rank k is equal to 1 when a final energy value given by the spectrum at frequency $f_{k+1}$ is greater than an average energy value of an acoustic wave in the frequency tranches [$f_k$, $f_{k+1}$] and 0 when a final energy value given by the spectrum at frequency $f_{k+1}$ is not greater than the average energy value of the acoustic wave in the frequency tranches [$f_k$, $f_{k+1}$]; and wherein (b) the last eight bits of the code are determined from the sensed signal when it is subdivided into nine predetermined temporal tranches [$t_k$, $t_k$], wherein k=1 ... 9 and wherein the bit of rank k+8 is equal to 1 when an average value of a signal power during the period [$t_k$, $t_{k+2}$] is greater than an average value of the signal power during the period [$t_{k+1}$, $t_{k+2}$], k=1 ... 8, 2 when an average value of a signal power during the period [$t_k$, $t_{k+1}$] is not greater than an average value of the signal power during the period [$t_{k+1}$, $t_{k+2}$], k= 1 ... 8.

38. A computer for locating a position of an impact on a surface of an object forming an acoustic interface, the surface provided with at least one acoustic sensor, the computer comprising:

instructions for receiving measurements of at least one sensed signal from acoustic waves generated in the object forming an acoustic interface by said impact;

instructions for localizing said position of said impact on said surface by processing of said at least one sensed signal, the processing characterized by a comparison of a sensed signal in the at least one sensed signal with at least one predetermined signal in a plurality of predetermined signals, wherein each respective predetermined signal in said plurality of predetermined signals corresponds to an active zone in a plurality of active zones on said surface, and each respective predetermined signal in said plurality of predetermined signals represents a signal that is sensed when a reference impact is generated on the active zone in said plurality of active zones that corresponds to the respective predetermined signal, and wherein, the position of the impact is associated with an active zone in said plurality of active zones by said instructions for localizing when the sensed signal is sufficiently similar to said predetermined signal corresponding to the active zone.

39. The computer of claim 38 wherein said acoustic waves generated in the object forming an acoustic interface by said impact are measured by at least one acoustic sensor that is in electrical communication with said computer.

40. A computer for identifying a location of an impact on a surface of an object, wherein said surface is delineated into a plurality of active zones, the computer comprising:

instructions for receiving measurements of a sensed signal from acoustic waves generated in the object by said impact;

instructions for comparing said sensed signal with a library of predetermined signals, each predetermined signal in said library of predetermined signals corresponding to an active zone in said plurality of active zones; wherein when a correspondence between said sensed signal and a respective predetermined signal in said library of sensed signals is sufficiently similar, said location of said impact is deemed to originate from the active zone corresponding to said respective predetermined signal.

41. The computer of claim 40 wherein said instructions for comparing comprise instructions for intercorrelating said sensed signal with a predetermined signal in said library of predetermined signals.

42. The computer of claim 40, further comprising instructions for normalizing said sensed signal prior to execution of said instructions for comparing.

43. The computer of claim 40, further comprising:

instructions for converting said sensed signal to a sensed code representative of said sensed signal and wherein said library of signals comprises a plurality of predetermined codes, each predetermined code in said plurality of predetermined codes representing a different signal in said plurality of predetermined signals; and wherein said instructions for comparing comprise comparing said sensed code with a predetermined code in said plurality of predetermined codes.

44. The computer of claim 43, wherein said sensed code is a 16-bit code wherein (a) the first eight bits of said 16-bit code are determined by a frequency spectrum of the sensed signal that is subdivided into eight predetermined frequency tranches [$f_k$, $f_{k+}$], wherein k=1 ... 8 and wherein the bit of rank k is equal to 1 when a final energy value given by the spectrum at frequency $f_{k+1}$ is greater than an average energy value of an acoustic wave in the frequency tranches [$f_k$, $f_k$] and 0 when a final energy value given by the spectrum at frequency $f_{k+1}$ is not greater than the average energy value of the acoustic wave in the frequency tranches [$f_k$, $f_{k+1}$]; and wherein (b) the last eight bits of the code are determined from the sensed signal when it is subdivided into nine predetermined temporal tranches $[t_k, t_k]$, wherein k=1.9 and wherein the bit of rank k+8 is equal to 1 when an average value of a signal power during the period $[t_k, t_{k+1}]$ is greater than an average value of the signal power during the period $[t_{k+1}, t_{k+2}]$, k=1 . . . 8, 0 when an average value of a signal power during the period $[t_k, t_{k+1}]$ is not greater than an average value of the signal power during the period $[t_{k+1}, t_{k+2}]$, k= 1 . . . 8.

* * * * *